United States Patent
Horiuchi

(10) Patent No.: US 10,553,183 B2
(45) Date of Patent: Feb. 4, 2020

(54) INJECTION MOLDING MACHINE

(71) Applicant: FANUC CORPORATION, Yamanashi (JP)

(72) Inventor: Atsushi Horiuchi, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 369 days.

(21) Appl. No.: 15/480,467

(22) Filed: Apr. 6, 2017

(65) Prior Publication Data

US 2017/0301315 A1 Oct. 19, 2017

(30) Foreign Application Priority Data

Apr. 13, 2016 (JP) ................................. 2016-080574

(51) Int. Cl.
*G09G 5/30* (2006.01)
*G09G 5/37* (2006.01)
(Continued)

(52) U.S. Cl.
CPC .............. *G09G 5/30* (2013.01); *B29C 45/03* (2013.01); *B29C 45/1774* (2013.01);
(Continued)

(58) Field of Classification Search
CPC combination set(s) only.
See application file for complete search history.

(56) References Cited

U.S. PATENT DOCUMENTS 8,952,912 B1\* 2/2015 Hock ................... G06F 3/0483
345/173
2006/0068049 A1 3/2006 Nishizawa
(Continued)

FOREIGN PATENT DOCUMENTS

CN 1754681 A 4/2006
DE 602005005128 T2 5/2009
(Continued)

OTHER PUBLICATIONS

Office Action in JP Application No. 2016-080574, dated May 15, 2018, 9pp.

*Primary Examiner* — Wesner Sajous
(74) *Attorney, Agent, or Firm* — Hauptman Ham, LLP

(57) ABSTRACT

In an injection molding machine of the present invention formed to have a plurality of injection apparatuses connected via a communication channel, a first injection apparatus among the plurality of injection apparatuses includes a display apparatus, a first control apparatus included in the first injection apparatus includes an operation screen input/output unit which obtains operation screen data from another injection apparatus and a rendering attribute converting unit which converts rendering attributes of rendering elements configuring an operation screen to be rendered based on the operation screen data. When an operation screen of the other injection apparatus is displayed on the display apparatus based on the operation screen data, the rendering attribute converting unit makes all or part of the rendering attributes of the rendering elements configuring the operation screen different from rendering attributes when an operation screen of the first injection apparatus is displayed. Thus, the operation screens of the plurality of the injection apparatuses are easily distinguishable.

11 Claims, 8 Drawing Sheets

(51) Int. Cl.
  *B29C 45/03* (2006.01)
  *B29C 45/17* (2006.01)
  *B29C 45/76* (2006.01)
  *G06F 3/14* (2006.01)
  *G06F 3/023* (2006.01)
  *G06F 3/0354* (2013.01)
  *G09G 5/14* (2006.01)
  *G09G 5/377* (2006.01)

(52) U.S. Cl.
  CPC ............ *B29C 45/766* (2013.01); *G06F 3/023* (2013.01); *G06F 3/03547* (2013.01); *G09G 5/14* (2013.01); *G09G 5/377* (2013.01); *B29C 2945/7611* (2013.01); *B29C 2945/76187* (2013.01); *G09G 2340/12* (2013.01); *G09G 2354/00* (2013.01)

(56) References Cited

U.S. PATENT DOCUMENTS

2006/0068050 A1   3/2006   Saito et al.
2012/0069180 A1*  3/2012   Kawamura ............. G09F 19/18
                                                       348/143
2014/0157200 A1*  6/2014   Jeon ....................... G06F 3/0482
                                                       715/834
2014/0349061 A1*  11/2014  Sikka .................... B29C 33/424
                                                       428/98
2017/0357324 A1*  12/2017  Chaudhri ................ G06F 3/016

FOREIGN PATENT DOCUMENTS

| | | |
|---|---|---|
| EP | 1640135 A1 | 3/2006 |
| JP | H10-113966 A | 5/1998 |
| JP | 2001219456 A | 8/2001 |
| JP | 2003-320545 A | 11/2003 |
| JP | 2006-88558 A | 4/2006 |
| JP | 2006-95760 A | 4/2006 |
| JP | 2013082181 A | 5/2013 |
| JP | 2014156096 A | 8/2014 |

\* cited by examiner

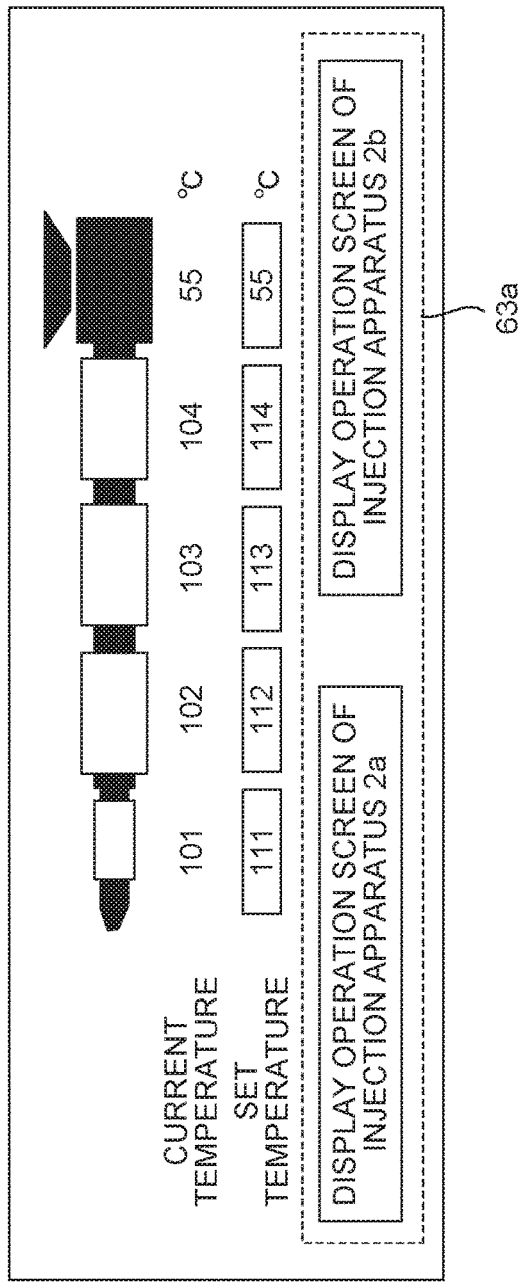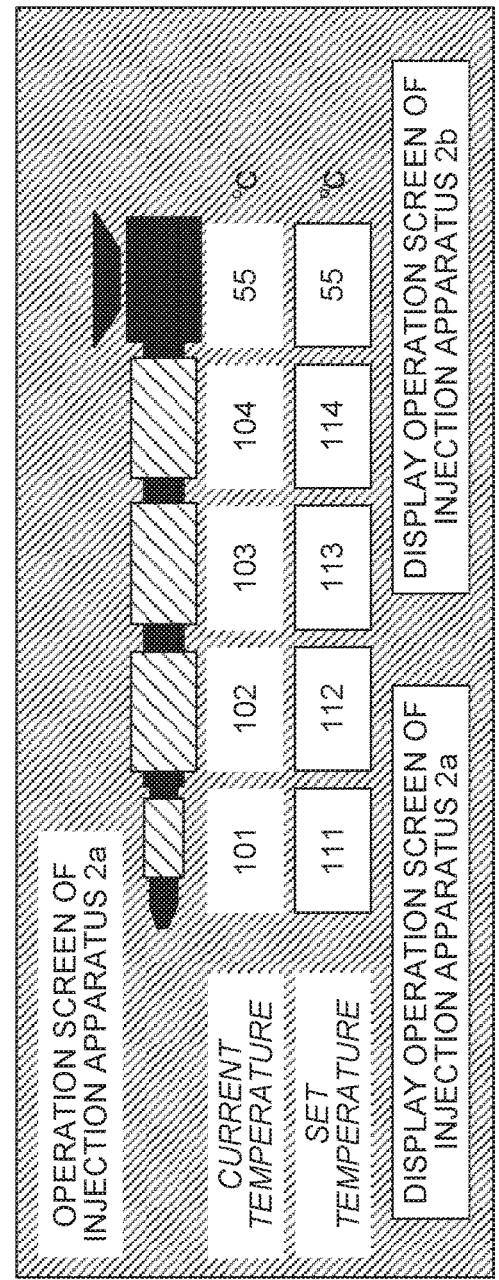

FIG. 5

RENDERING ATTRIBUTE CONVERSION TABLE 541b

| No. | INJECTION APPARATUS TYPE | RENDERING ITEM | BEFORE CONVERSION | AFTER CONVERSION |
|---|---|---|---|---|
| 1 | INJECTION APPARATUS 2a | BACKGROUND COLOR | WHITE, SOLID | GRAY, DIAGONALLY LEFTWARD LINE |
| 2 | INJECTION APPARATUS 2a | HEATER DIAGRAM | WHITE, SOLID | BLACK, DIAGONALLY RIGHTWARD LINE |
| 3 | INJECTION APPARATUS 2a | CHARACTER FONT | GOTHIC STANDARD | GOTHIC BOLD |
| 4 | INJECTION APPARATUS 2b | BACKGROUND COLOR | WHITE, SOLID | GREEN, DIAGONALLY LEFTWARD LINE |
| 5 | INJECTION APPARATUS 2b | HEATER DIAGRAM | WHITE, SOLID | RED, DIAGONALLY RIGHTWARD LINE |
| 6 | INJECTION APPARATUS 2b | CHARACTER FONT | GOTHIC STANDARD | GOTHIC BOLD |

INJECTION MOLDING MACHINE

RELATED APPLICATIONS

The present application claims priority to Japanese Application Number 2016-080574 filed Apr. 13, 2016, the disclosure of which is hereby incorporated by reference herein in its entirety.

BACKGROUND OF THE INVENTION

1. Field of the Invention

The present invention relates to a display apparatus of an injection molding machine including a plurality of injection apparatuses.

2. Description of the Related Art

Before operation of an injection molding machine, it is required to check various current values displayed on an operation screen formed on a display unit of a display apparatus included in the injection molding machine and set various molding conditions regarding operation of the injection molding machine to the display apparatus by using input means such as a touch panel. Examples of such various current values include a current position of a motor for driving an injection apparatus, a current temperature of a cylinder, a current pressure of molding resin, and a status. Examples of such various molding conditions include those regarding operation of the injection molding machine, such as a mold open/close condition, an injection condition, a measuring condition, and a cylinder heating condition.

In general, to set a molding condition regarding operation of the injection molding machine, an electric-type operation key as input means included in the display apparatus or a touch panel included in the display unit on the display apparatus is pressed. Here, a predetermined operation screen is selected from among a plurality of operation screens displayed on the display unit, a molding condition setting item to be operated is selected on the operation screen, and then a new set value is inputted.

Also, a molding method has been known in which a plurality of injection molding machines are combined, a molding condition is set from a display apparatus included in each injection molding machine, and molding resin is injected into a mold apparatus from the injection apparatus included in each injection molding machine, thereby obtaining one molded product.

Furthermore, a molding method and injection molding machine have been known in which one injection molding machine includes a plurality of injection apparatuses and the plurality of these injection apparatuses are sequentially driven to mold an integrally-molded product configured of a plurality of pieces of molding resin. Note that in an injection molding machine including a plurality of injection apparatuses, a display apparatus may be provided for each injection apparatus. In this manner, in the injection molding machine including a plurality of display apparatuses, an operator is required to check the operation screen for each display apparatus and set various molding conditions for each display apparatus for operation of the injection molding machine, resulting in poor operability.

An injection molding machine has been known in which display apparatuses included in all injection apparatuses are connected through a communication channel such as Ethernet (registered trademark) to allow various current values of all injection apparatuses to be displayed and various molding conditions to be set by using one display apparatus among the display apparatuses included in the plurality of injection apparatuses. For example, Japanese Patent Application Laid-Open No. 2014-156096 discloses a technique in which a plurality of injection molding machines are connected through a communication channel and set values of molding conditions stored in each injection molding machine are obtained through communication for screen display. Also, Japanese Patent Application Laid-Open No. 2013-082181 discloses a technique in which one display apparatus centrally managing a plurality of injection molding machines obtains monitor data of the plurality of injection molding machines and collectively displays a graph regarding the plurality of injection molding machines on one operation screen.

Furthermore, Japanese Patent Application Laid-Open No. 2001-219456 discloses a technique in which by using a display setting switching apparatus included in a plurality of injection molding machines, a display apparatus for displaying the state of the injection molding machine or a control apparatus for setting a molding condition are switched to display an operation screen of an injection molding machine to be operated. With this, the operator can check operation screens of all injection molding machines and set a molding condition at the display apparatus included in one injection molding machine, thereby eliminating time and effort for directly operating the display apparatus of each of the injection molding machines.

However, in the techniques disclosed in Japanese Patent Application Laid-Open Nos. 2014-156096 and 2013-082181, it is required to define, in advance, current values and items of molding conditions to be displayed on the operation screen, and rendering attributes such as a rendering color and rendering shape and register the defined data in the injection molding machine. Thus, whenever the rendering contents such as current values and molding conditions configuring the operation screen of the injection molding machine are changed, it is required to change the definition of the rendering attribute of each item and register the changed definition in the injection molding machine. Therefore, the rendering state of the operation screen cannot be easily changed. Also, in the technique disclosed in Japanese Patent Application Laid-Open No. 2001-219456, a display setting switching apparatus is provided separately from the display apparatus, thereby posing a problem of an increase in cost.

Moreover, there are a plurality of types of the operation screen to be displayed on the display apparatus of each injection apparatus. Examples of the operation screen type include an injection screen for setting a motor speed and motor position for driving the injection apparatus as injection conditions and a cylinder heat screen for setting a temperature at which a heater of a cylinder is heated as a cylinder heating condition. These items to be rendered on the operation screen are required also for driving any of the injection apparatuses, and the operation screens such as the injection screen and the cylinder heating screen of each injection apparatus have similar rendering contents on the operation screen even among different injection apparatuses. Thus, when the operation screens of a plurality of injection apparatuses are displayed on one display apparatus, it is difficult for the operator to identify an injection apparatus to which the operation screen to be operated belongs, among the plurality of injection apparatuses. Furthermore, if the operator misrecognizes the injection apparatus to which the operation screen being operated belongs, the operator sets an erroneous molding condition in the display apparatus included in the injection apparatus. As a result, the injection molding machine does not operate as expected, possibly causing a molding defect in a molded product or incurring the risk of damaging a mold.

SUMMARY OF THE INVENTION

Thus, an object of the present invention is to provide a display apparatus in an injection molding machine including a plurality of injection apparatuses, the display apparatus which provides a visual difference making operation screens of the respective injection apparatuses easily distinguishable when, on a display apparatus of an injection apparatus, the operation screen displayed on a display apparatus included in a different injection apparatus is displayed.

An injection molding machine having a display apparatus according to the present invention is formed to have a plurality of injection apparatuses connected via a communication channel, the plurality of injection apparatuses each including an injection mechanism unit and a control apparatus, in which a first injection apparatus among the plurality of injection apparatuses includes a display apparatus, a first control apparatus included in the first injection apparatus includes an operation screen input/output unit which obtains, from another injection apparatus among the plurality of injection apparatuses, operation screen data of the other injection apparatus, and a rendering attribute converting unit which converts rendering attributes of rendering elements configuring an operation screen to be rendered based on the operation screen data, and when an operation screen of the other injection apparatus is displayed on the display apparatus based on the operation screen data, the rendering attribute converting unit makes all or part of the rendering attributes of the rendering elements configuring the operation screen different from rendering attributes when an operation screen of the first injection apparatus is displayed.

The injection molding machine having the display apparatus according to the present invention further includes a rendering attribute conversion table which defines conversion rules for converting the rendering attributes of the rendering elements configuring the operation screen to be displayed based on the operation screen data of the injection apparatus, in which the rendering attribute converting unit converts the rendering attributes of the rendering elements configuring the operation screen to be rendered based on the operation screen data according to the conversion rules defined on the rendering attribute conversion table.

In the injection molding machine having the display apparatus according to the present invention, the communication channel is a wired communication channel or a wireless communication channel, and the operation screen input/output unit obtains the operation screen data from the other injection apparatus via the communication channel.

In the injection molding machine having the display apparatus according to the present invention, the display apparatus further includes a touch panel or a pointing device, and an operation screen switching unit which switches an operation screen to be displayed on the display apparatus to another operation screen based on selection of part of graphic information or character information to be rendered on the operation screen by operation of the touch panel or the pointing device.

In the injection molding machine having the display apparatus according to the present invention, the display apparatus further includes an electric-type operation button, and an operation screen switching unit which switches the operation screen to be displayed on the display apparatus to another operation screen based on a pressing operation of the electric-type operation button.

In the injection molding machine having the display apparatus according to the present invention, the rendering elements are characters or graphics, and the rendering attributes are attributes which specify rendering colors or shapes of the rendering elements.

In the injection molding machine having the display apparatus according to the present invention, when the operation screen of the other injection apparatus is displayed on the display apparatus based on the operation screen data, the rendering attribute converting unit adds a predetermined character string or graphic to the operation screen.

In the injection molding machine having the display apparatus according to the present invention, on the display apparatus, the operation screen of the first injection apparatus and an entire or part of the operation screen of the other injection apparatus are displayed as being aligned or overlapping each other.

In the injection molding machine having the display apparatus according to the present invention, each of the plurality of injection apparatuses further has a molding condition storage unit which stores a molding condition regarding operation of the injection apparatus, and a molding condition of the injection apparatus set via the display apparatus of the first injection apparatus is obtained and stored in the molding condition storage unit.

In the injection molding machine having the display apparatus according to the present invention, the display apparatus is attachable to and detachable from the injection apparatus.

An injection molding machine according to the present invention is formed to have a plurality of injection apparatuses connected via a communication channel, the plurality of injection apparatuses each including an injection mechanism unit and a control apparatus, in which the control apparatus included in each of the plurality of injection apparatuses includes a rendering attribute converting unit which converts rendering attributes of rendering elements configuring an operation screen to be rendered based on operation screen data of the injection apparatus, a first injection apparatus among the plurality of injection apparatuses includes a display apparatus, a first control apparatus included in the first injection apparatus includes an operation screen input/output unit which obtains, from another injection apparatus among the plurality of injection apparatuses, operation screen data of the other injection apparatus, and when the first injection apparatus obtains the operation screen data of the other injection apparatus, the rendering attribute converting unit of the other injection apparatus makes all or part of the rendering attributes of the rendering elements configuring the operation screen different from rendering attributes when an operation screen of the first injection apparatus is displayed.

According to the present invention, on the display apparatus of an injection apparatus, the operation screen of a different injection apparatus is displayed, and a visual difference is provided to the operation screen so as to make the operation screens of the respective injection apparatuses easily distinguishable. Therefore, the operator can easily identify the operation screen of the injection apparatus to be operated. When the operator misrecognizes the operation screen of the injection apparatus to be operated and erroneously sets a molding condition, the injection molding machine does not operate as expected, possibly causing a molding defect in a molded product or incurring the risk of damaging a mold. In the present invention, since the operation screen of the injection apparatus to be operated can be easily identified, an erroneous operation by the operator can be prevented.

BRIEF DESCRIPTION OF THE DRAWINGS

The above and other objects and features of the present invention will become apparent from the following description of exemplary embodiments with reference to the accompanying drawings in which:

FIG. 3 is a diagram depicting an example in which an operation screen of the injection apparatus is displayed;

FIG. 4 is a diagram depicting an example in which, on the display apparatus of the injection apparatus, an operation screen of another injection apparatus is displayed, FIG. 5 is a diagram depicting an example of a rendering attribute conversion table;

DETAILED DESCRIPTION OF THE PREFERRED EMBODIMENT

In the following, an embodiment of the present invention is described together with the drawings.

Figure 1:
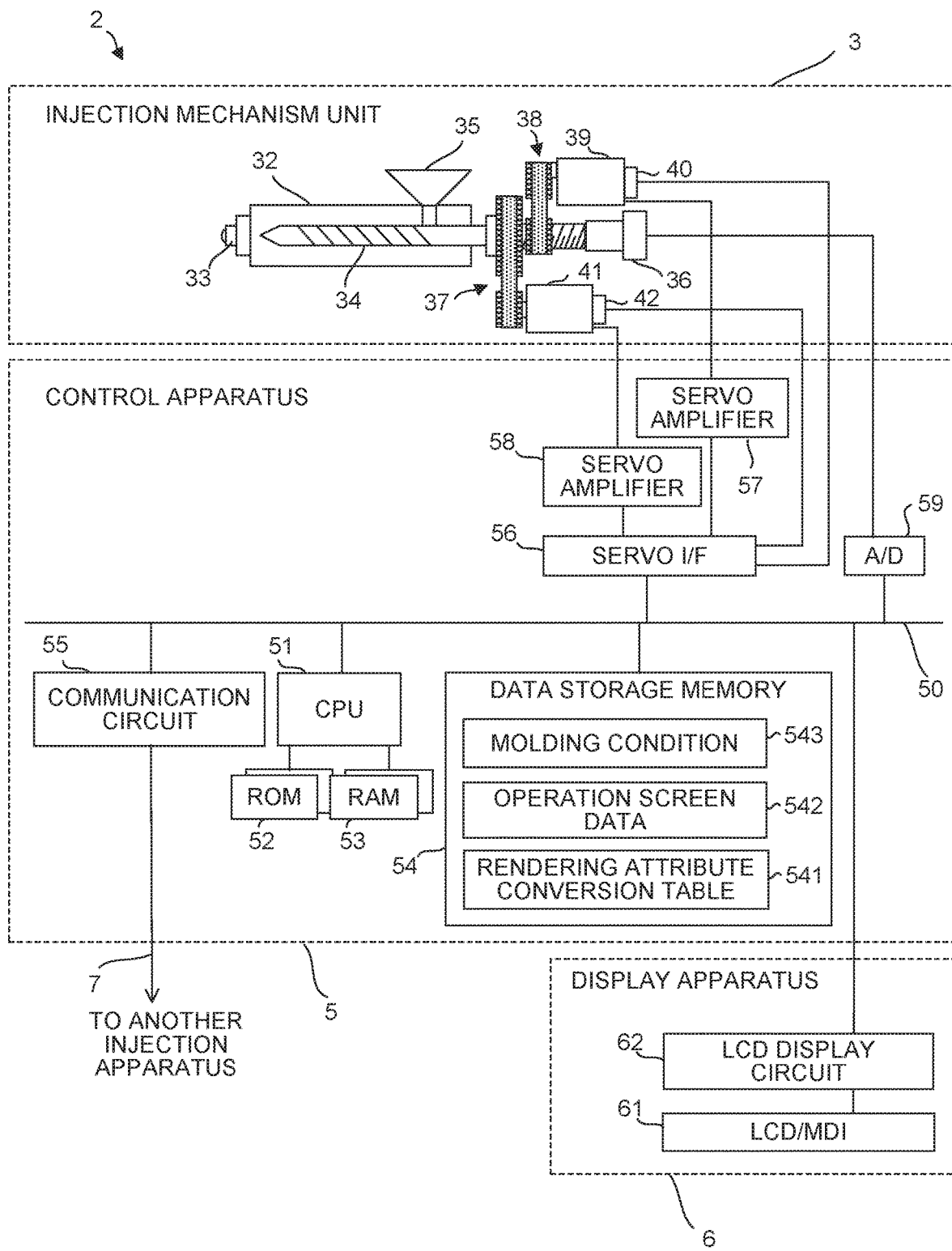
FIG. 1 is a diagram depicting the structure of main parts of an injection mechanism unit, a control apparatus, and a display apparatus included in an injection apparatus.

FIG. 1 is a diagram describing the structure of main parts of an injection mechanism unit 3, a control apparatus 5, and a display apparatus 6 included in one injection apparatus 2 among a plurality of injection apparatuses of an injection molding machine.

In the injection mechanism unit 3, a nozzle 33 is attached at a tip of a cylinder 32 with a screw 34 inserted therein, and a hopper 35 for supplying resin pellets to the cylinder 32 is mounted on a rear end of the cylinder 32. Also, for example, an injection servo motor 39 as driving means for driving the screw 34 in an axial direction and a transfer mechanism 38 configured of a belt, a pulley, and so forth are provided. These injection servo motor 39, transfer mechanism 38, and so forth drive the screw 34 in the axial direction for injection and back-pressure control. Also, a screw rotation servo motor 41 as rotation driving means for rotating the screw 34 and a transfer mechanism 37 configured of a belt, a pulley, and so forth are provided. These servo motor 41 and transfer mechanism 37 rotate and drive the screw 34.

On each of the injection servo motor 39 and the screw rotation servo motor 41, a position/speed detector 40 and a position/speed detector 42 are mounted, respectively, each of which detects a rotation position and speed of the relevant servo motor. These position/speed detectors 40 and 42 can detect a position of the screw 34 (the position in a screw axial direction), moving speed (injecting speed), and rotation speed of the screw 34. Also, a force detector 36 such as a load cell is provided, which detects a force applied to the screw 34 from melted resin and received in the screw axial direction.

To a CPU 51, a ROM 52 which stores, for example, an automatic operation program for controlling the injection molding machine as a whole and a RAM 53 for use in, for example, temporary storage of arithmetic operation data are connected.

Also, to the CPU 51, a servo amplifier 57 which drives the injection servo motor 39 based on an instruction from the CPU 51 and a servo amplifier 58 which drives the screw rotation servo motor 41 are connected via a servo I/F 56.

As described above, the position/speed detectors 40 and 42 are mounted on the servo motors 39 and 41, respectively. Outputs from these position/speed detectors 40 and 42 are fed back via the servo I/F 56 to the CPU 51. The CPU 51 performs position/speed feedback control based on a movement instruction to each shaft (the injection servo motor 39 and the screw rotation servo motor 41) from a program and the detected position and speed fed back from the position/speed detectors 40 and 42.

Also, a current position register is provided, which finds a forwarding position (position in the axial direction) of the screw 34 from a position feedback signal from the position/speed detector 40, and is configured so as to allow the position of the screw to be detected by the current position register. Also, the CPU 51 has inputted thereto a resin pressure (resin pressure on the screw) obtained by converting a detection signal at the force detector 36 into a digital signal at an A/D converter 59.

The display apparatus 6 is configured with an LCD/MDI (display-apparatus-equipped input apparatus) 61 configured of a liquid-crystal panel, a touch panel, a keyboard, and so forth connected to a bus 50 via an LCD display circuit 62. Note that the display apparatus 6 may be configured so as to be attachable to and detachable from the injection apparatus 2.

To the bus 50, a data storage memory 54 configured of a non-volatile memory, a communication circuit 55, and so forth are also connected. The following pieces of data are stored in this data storage memory 54: molding conditions 543 regarding operation of the injection molding machine 1, operation screen data 542 (where a plurality of pieces of operation screen data can be stored, such as injection screen data required for driving the injection apparatus and cylinder heating screen data) including rendering contents (for example, a character string and graphic including a current value/molding condition setting item and so forth) on an operation screen for setting or displaying setting items of the molding conditions (for example, cylinder temperatures, screw position, and screw speed), and a rendering attribute conversion table 541 (for example, a method of converting rendering color, line type, font, and so forth). Also, a communication channel 7 is to perform information transfer between the injection apparatuses by connecting to another injection apparatus, and may be for wired communication or wireless communication.

With the above-described structure, based on the operation program in the ROM 52 and the molding conditions 543 and so forth stored in the data storage memory 54, the CPU 51 distributes a movement instruction to the servo motors 39 and 41 of the respective shafts, and, as with the prior art technique, the CPU 51 performs servo control of position loop control, speed loop control, and, furthermore, current loop control, thereby performing a so-called digital servo process.

Figure 2:
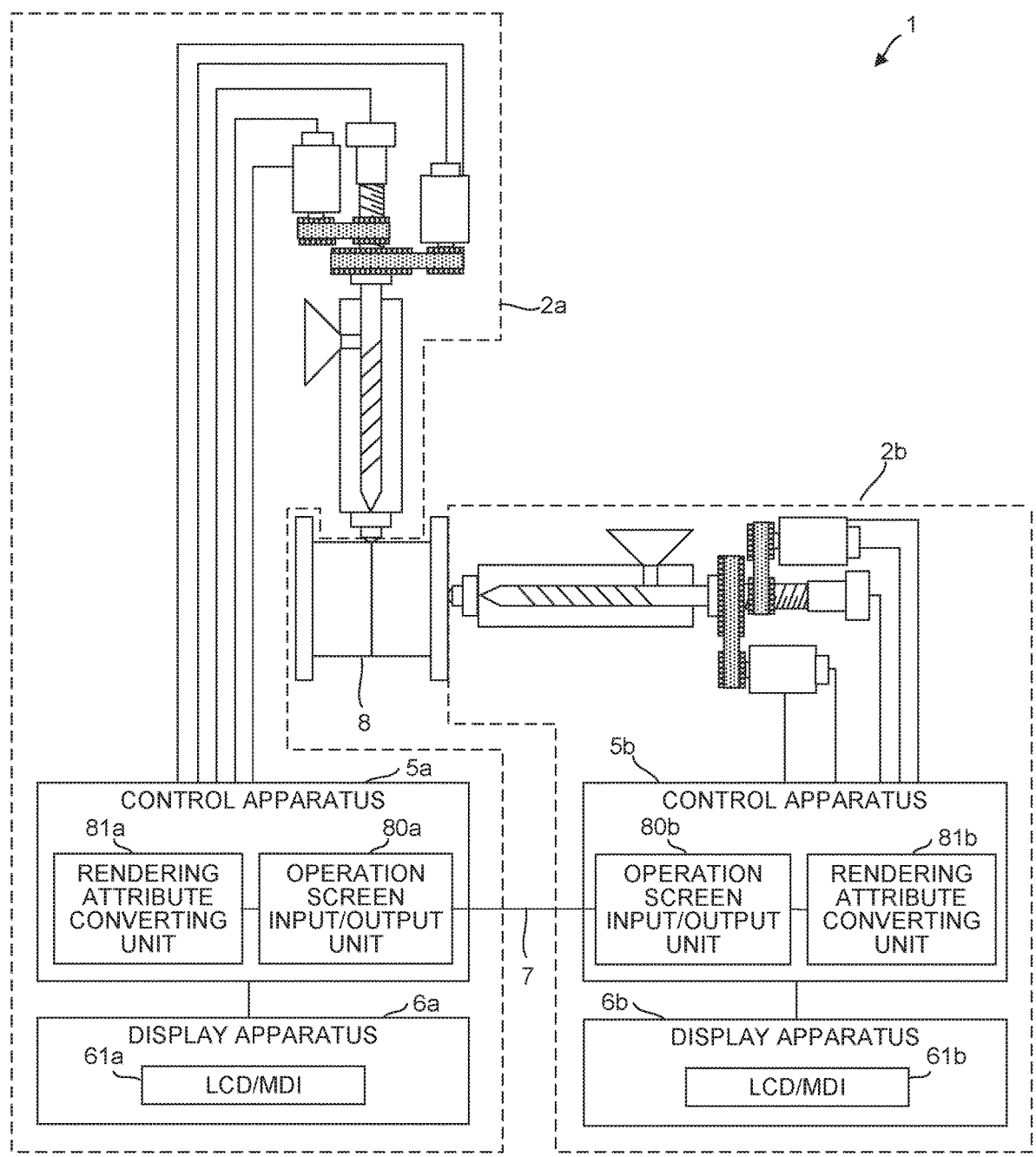
FIG. 2 is a diagram depicting a system structure of an injection molding machine according to one embodiment of the present invention.

FIG. 2 is a diagram describing a system structure of the injection molding machine according to one embodiment of the present invention. In the embodiment depicted in FIG. 2, two injection apparatus, that is, an injection apparatus 2a and an injection apparatus 2b, having the structure described with reference to FIG. 1, configure an injection molding machine 1. Note in the following that a component included in an injection apparatus is described by using a reference character with an English character identical to that provided to the injection apparatus provided at the tail of the reference numeral used in the description of FIG. 1.

In the injection apparatuses 2a and 2b depicted in FIG. 2, display apparatuses 6a and 6b are configured so as to be attachable thereto and detachable therefrom. For example, the display apparatus 6b of the injection apparatus 2b can be removed to allow not only the operation screen of the injection apparatus 2a but also the operation screen of the injection apparatus 2b to be displayed on an LCD/MDI 61a of the display apparatus 6a of the injection apparatus 2a.

As means for exchanging the respective operation screens between the injection apparatuses 2a and 2b, the injection apparatuses 2a and 2b include operation screen input/output units 80a and 80b, respectively. The operation screen input/output units 80a and 80b each obtain operation screen data and so forth from the counterpart injection apparatus by using the communication channel 7 configured for wired communication or wireless communication. Examples of wired communication include serial communication such as RS-485, Ethernet communication, and optical communication. Examples of wireless communication include wireless LAN, Wi-Fi (registered trademark), and Bluetooth (registered trademark).

In the injection molding machine 1 depicted in FIG. 2, via a communication channel 7, the contents of operation screen data 542a and a rendering attribute conversion table 541a stored in a data storage memory 54a (not depicted) of the injection apparatus 2a are obtained by the operation screen input/output unit 80b of the injection apparatus 2b and, conversely, the contents of operation screen data 542b and a rendering attribute conversion table 541b stored in a data storage memory 54b of the injection apparatus 2b are obtained by the operation screen input/output unit 80a of the injection apparatus 2a, for example. With this, on the LCD/MDI of the display apparatus included in an injection apparatus, the operation screen of a different injection apparatus can be displayed.

With the above-described structure, the operator can check the operation screens of all injection apparatuses and set molding condition setting items at one display apparatus. Therefore, it is possible to save time and effort for performing operation for each of the plurality of display apparatuses, thereby improving operability. Also, there is a merit in reducing cost by removing and omitting display apparatuses other than the display apparatus to be used by the operator.

FIG. 3 is a diagram depicting an example of the operation screen of the injection apparatus 2a displayed on the LCD/MDI 61a of the display apparatus 6a of the injection apparatus 2a depicted in FIG. 2. In the example of operation screen of FIG. 3, an operation screen is displayed on the LCD/MDI 61a, with various current values regarding the operation of the injection apparatus 2a (for example, current temperature of a cylinder) and various molding condition setting items (for example, set temperature of the cylinder) stored in the data storage memory 54a (not depicted).

While the operation screen of the injection apparatus 2a depicted in FIG. 3 is being displayed, by the input means such as a touch panel included in the LCD/MDI 61a, for example, if a button "Display operation screen of injection apparatus 2b" on the operation screen of FIG. 3 is pressed, the operation screen to be displayed on the LCD/MDI 61a of the display apparatus 6a can be switched from the operation screen of the injection apparatus 2a to the operation screen of the injection apparatus 2b. While the operation screen of the injection apparatus 2b is being displayed on the LCD/MDI 61a of the display apparatus 6a, when a button "Display operation screen of injection apparatus 2a" is pressed, the operation screen can be switched from the operation screen of the injection apparatus 2b to the operation screen of the injection apparatus 2a. These so-called software keys 63a function as an operation screen switching unit.

Note that, as the operation screen switching unit, an MDI key may be used, which is an electrical-type operation button included in the LCD/MDI 61a of the display apparatus 6a.

FIG. 4 is a diagram depicting an example in which the injection apparatus 2b obtains the operation screen data of the injection apparatus 2a through communication, converts rendering attributes of rendering elements on the operation screen of the injection apparatus 2a to be displayed based on the obtained operation screen data of the injection apparatus 2a, and displays the operation screen on the LCD/MDI 61b of the display apparatus 6b. To display the operation screen of the injection apparatus 2a on the injection apparatus 2b, the button "Display operation screen of injection apparatus 2a" arranged on the operation screen of the injection apparatus 2b displayed on the LCD/MDI 61b of the injection apparatus 2b (although not depicted, the operation screen similar to that of FIG. 3) is touched. When the button "Display operation screen of injection apparatus 2a" is touched on the operation screen of the injection apparatus 2b, the operation screen input/output unit 80b of a control apparatus 5b included in the injection apparatus 2b obtains, via the communication channel 7, the operation screen data of the injection apparatus 2a stored in the data storage memory 54a of a control apparatus 5a included in the injection apparatus 2a. Then, based on the rendering attribute conversion table 541b stored in advance in the data storage memory 54b of the control apparatus 5b included in the injection apparatus 2b, a rendering attribute converting unit 81b converts all or part of the rendering elements of the operation screen of the injection apparatus 2a to be displayed based on the operation screen data 542a of the injection apparatus 2a, and a thus-converted operation screen is displayed on the LCD/MDI 61b of the display apparatus 6b.

FIG. 5 is a diagram depicting an example of the rendering attribute conversion table 541b stored in advance in the data storage memory 54b included in the control apparatus 5b of the injection apparatus 2b. The rendering attribute conversion table is a table stored in advance in the data storage memory included in each injection apparatus and, when an injection apparatus causes an operation screen to be displayed on the LCD/MDI based on operation screen data obtained from another injection apparatus, defining, for each injection apparatus, a conversion rule for conversion of a rendering attribute or the like of a rendering element to be displayed on the operation screen. Note that, as depicted in FIG. 5, a conversion rule for conversion of rendering contents of the operation screen of the injection apparatus itself can be defined in the rendering attribute conversion table.

When the rendering attribute conversion table 541b depicted in FIG. 5 is stored in the data storage memory 54b of the injection apparatus 2b, as for the operation screen data obtained by the operation screen input/output unit 80b from the injection apparatus 2a, based on a conversion rule No. 1 on the rendering attribute conversion table 541b, the rendering attribute converting unit 81b of the control apparatus 5b included in the injection apparatus 2b converts the background color of "background", which is a rendering element of the operation screen to be displayed based on the operation screen data, from "white, solid" to "gray, diagonally leftward line" for display on the LCD/MDI 61b of the display apparatus 6b of the injection apparatus 2b. Similarly, "heater diagram" and "character font", each of which is a rendering element of the operation screen, are converted based on a conversion rule No. 2 and a conversion rule No. 3, respectively, on the rendering attribute conversion table 541b stored in the data storage memory 54b, and are displayed on the LCD/MDI 61b of the display apparatus 6b of the injection apparatus 2b.

Note that the conversion rules defined on the rendering attribute conversion table become suitable if a different rendering attribute after conversion regarding the same rendering element is set for each injection apparatus. For example, in the example of the rendering attribute conversion table stored in advance in the data storage memory 54b of the injection apparatus 2b depicted in FIG. 5, the background color of the injection apparatus 2a is converted from "white, solid" to "gray, diagonally leftward line" based on the conversion rule No. 1 on the rendering attribute conversion table, and the background color of the injection apparatus 2b is converted from "white, solid" to "green, diagonally leftward line" based on the conversion rule No. 4 on the rendering attribute conversion table. In this manner, it is possible to make conversion to a different rendering attribute for each injection apparatus corresponding to the operation screen. With this, even if the operation screens of the plurality of injection apparatuses are displayed as being switched or displayed in an aligned manner on the LCD/MDI of one display apparatus, the operator can easily identify the operation screen of the injection apparatus to be operated. Therefore, an erroneous operation by the operator can be prevented.

Also, the conversion rules on the rendering attribute conversion table 541b are not restricted to those of the example described above, and may be in other various modes. Examples of the rendering attributes may include a character font size, reduction or enlargement ratio of a character or graphic, and shift amount or rotation amount of a rendering position. For example, there is a molding machine formed of an injection apparatus as the injection apparatus 2b of FIG. 2 arranged to be oriented to a mold open/close direction (lateral direction in FIG. 2) and an injection apparatus as the injection apparatus 2a of FIG. 2 arranged so as to be perpendicular to the mold open/close direction. In the injection molding machine with the injection apparatuses arranged in this manner, the operation screen of the injection apparatus 2a may be displayed on the injection apparatus 2b, with the orientation of a graphic arranged on the operation screen of the injection apparatus 2a being rotated by 90 degrees counterclockwise to convert the laterally-oriented graphic into a vertically-oriented graphic. Since this causes the arrangement of the machines and the arrangement of graphics on the operation screens to become identical, it is possible for the operator to more clearly identify each injection apparatus, thereby further improving operability.

Figure 6:
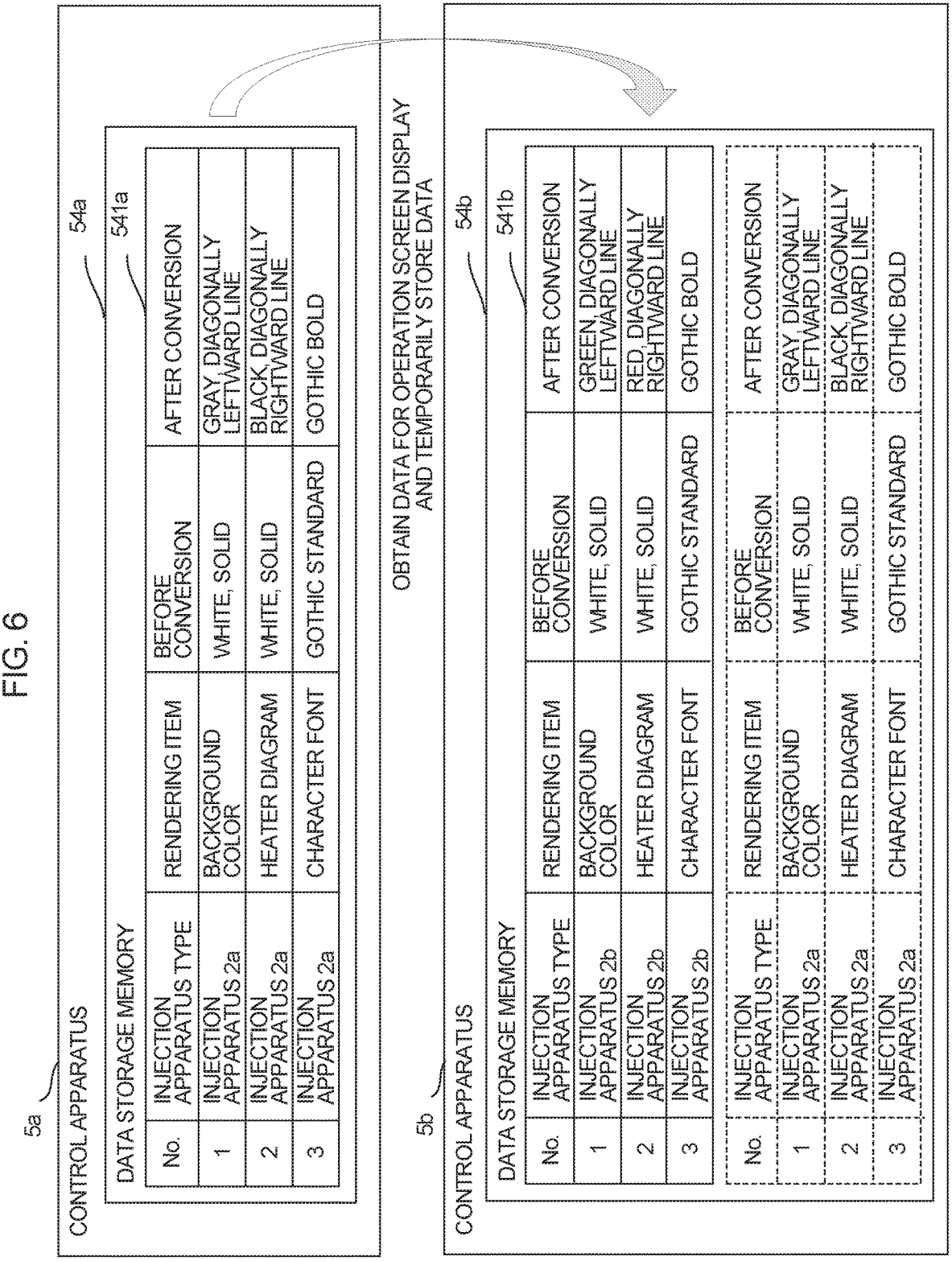
FIG. 6 is a diagram depicting an example in which the rendering attribute conversion table is obtained from another injection apparatus.

Another exemplary rendering attribute changing method may be configured in a manner such that, in the data storage memory of each injection apparatus, the rendering attribute conversion table for use in displaying the operation screen of the injection apparatus is stored in advance and, when the operation screen of an injection apparatus is displayed, the rendering attribute conversion table for use in displaying the operation screen of that injection apparatus is obtained from the injection apparatus through communication. An exemplary structure is as follows. That is, as depicted in FIG. 6, in the data storage memory 54a of the control apparatus 5a of the injection apparatus 2a, the rendering attribute conversion table 541a for use in displaying the operation screen of the injection apparatus 2a is stored in advance. In the data storage memory 54b of the control apparatus 5b of the injection apparatus 2b, the rendering attribute conversion table 541b for use in displaying the operation screen of the injection apparatus 2b is stored in advance. Then, with the button "Display operation screen of injection apparatus 2a" being touched on the LCD/MDI 61b of the injection apparatus 2b, when the injection apparatus 2b causes the operation screen of the injection apparatus 2a to be displayed on the LCD/MDI 61b, the operation screen input/output unit 80b of the control apparatus 5b included in the injection apparatus 2b obtains the operation screen data 542a of the injection apparatus 2a as well as the rendering attribute conversion table 541a from the data storage memory 54a of the control apparatus 5a included in the injection apparatus 2a via the communication channel 7 and temporarily stores the obtained data in the data storage memory 54b of the control apparatus 5b included in the injection apparatus 2b and, by using this temporarily-stored rendering attribute conversion table 541a, converts, for example, the rendering attribute of each rendering element of the operation screen of the injection apparatus 2a for display on the LCD/MDI 61b.

Also, when the above-described rendering attribute changing method is adopted, even different operation screens may have the same rendering attribute. For example, a plurality of pieces of operation screen data such as an injection screen and a cylinder heating screen required for driving the injection apparatus are stored in the data storage memory 54a of the injection apparatus 2a, but different operation screens have rendering attribute conversion tables of the same contents. In this case, if the rendering attribute conversion tables before and after operation screen switching have the same contents, the rendering attribute conversion table temporarily stored in the data storage memory 54b before operation screen switching can be used without changing. Therefore, in operation screen switching, the rendering attribute conversion table is not obtained from the injection apparatus 2a through communication, but only the rendering contents of the operation screen are communicated between the injection apparatus 2a and the injection apparatus 2b. With this, the amount of communication data between the injection apparatus 2a and the injection apparatus 2b can be reduced, and the communication load on the communication channel 7 can be advantageously reduced. Furthermore, since the communication time at the time of screen switching can be reduced, there is a merit in achieving a short operation screen switching time.

Furthermore, when the injection apparatus 2b obtains the rendering attribute conversion table 541a from the injection apparatus 2a by using the communication channel 7, the rendering attribute conversion table 541*a* also including predetermined character string information and graphic information may be obtained through communication and stored in the data storage memory 54*b*, and the operation screen in association with a predetermined character string and graphic may be displayed on the display apparatus of the injection apparatus. As a method of displaying the operation screen in association with a predetermined character string and graphic, the predetermined character string and graphic may be additionally displayed on the operation screen, may be displayed near the operation screen, or may be displayed as a tab or the like.

For example, when "Operation screen of injection apparatus 2*a*" is displayed on the LCD/MDI 61*b* of the injection apparatus 2*b* as predetermined character string information, the injection apparatus 2*b* obtains character string information "Operation screen of injection apparatus 2*a*" stored in the data storage memory 54*a* of the injection apparatus 2*a* through communication, stores the character string information obtained through communication in the data storage memory 54*b* of the injection apparatus 2*b*, and adds the predetermined character string "Operation screen of injection apparatus 2*a*" to the operation screen as depicted in FIG. 4 for display on the LCD/MDI 61*b* of the injection apparatus 2*b*. In this manner, by displaying the predetermined character string or graphic in association with the operation screen, even if a plurality of similar operation screens of different injection apparatuses are displayed on the display unit of one display apparatus, the operator can easily visually distinguish and identify the operation screen of the injection apparatus to be operated. Thus, an erroneous operation or misidentification by the operator can be prevented.

Note that while the example of displaying the operation screen of the injection apparatus 2*a* on the LCD/MDI 61*b* of the injection apparatus 2*b* has been mainly described above, the operation screen of the injection apparatus 2*b* may be displayed on the LCD/MDI 61*a* of the injection apparatus 2*a*.

Figure 7:
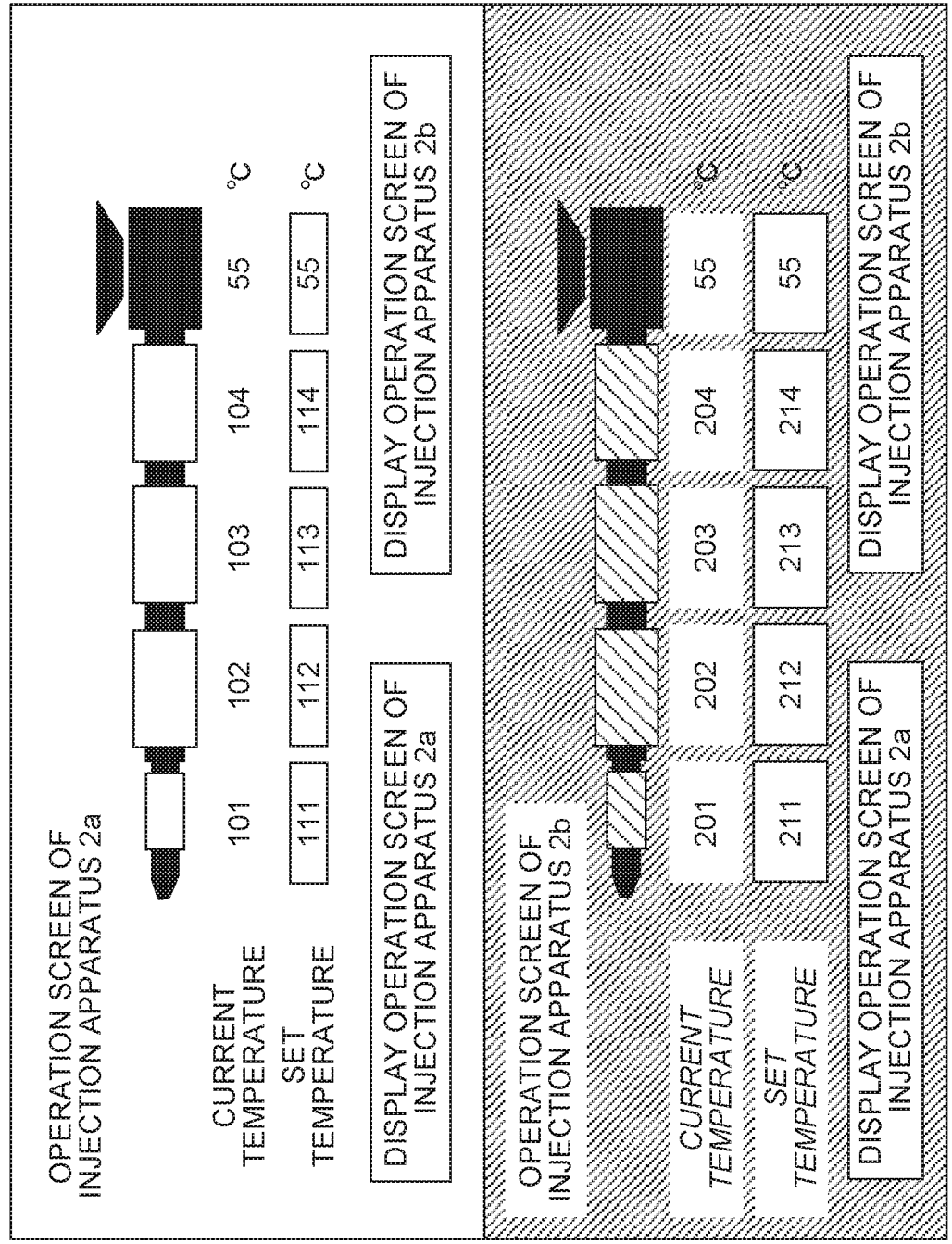
FIG. 7 is a diagram depicting an example in which operation screens of two injection apparatuses are displayed as being aligned on the display apparatus.
Figure 8:
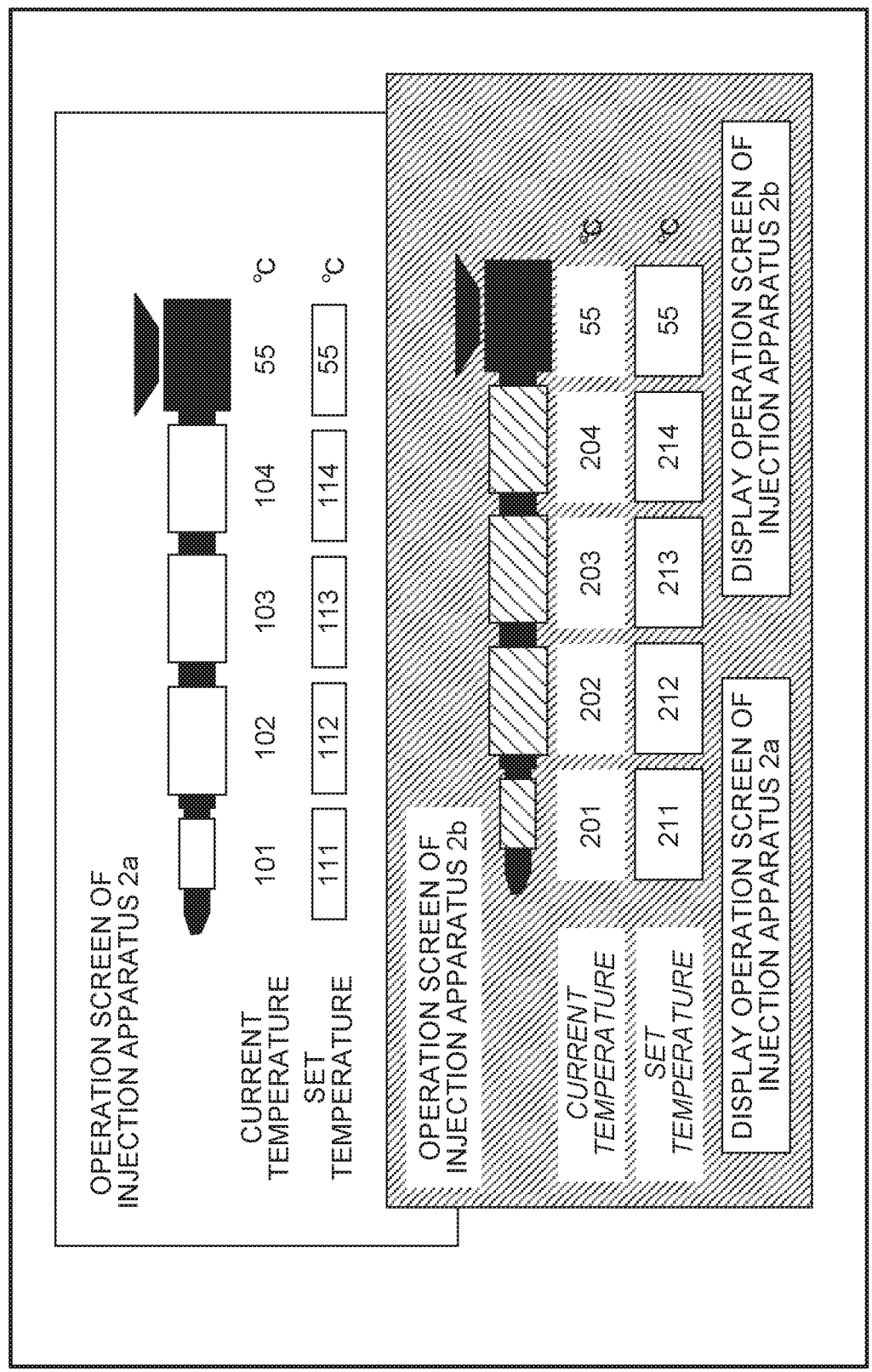
FIG. 8 is a diagram depicting an example in which operation screens of two injection apparatuses are displayed as overlapping each other on the display apparatus.

In the present invention, a display mode other than the mode in which the operation screens of a plurality of injection apparatuses are switched for display can be taken. For example, FIG. 7 depicts a state in which the operation screen of the injection apparatus 2*a* and the operation screen of the injection apparatus 2*b* are vertically aligned for display on the LCD/MDI 61*a* of the injection apparatus 2*a*, and FIG. 8 depicts a state in which the operation screen of the injection apparatus 2*a* and the operation screen of the injection apparatus 2*b* overlap each other for display on the LCD/MDI 61*a* of the injection apparatus 2*a*.

In this manner, by displaying the operation screens of the plurality of injection apparatuses on the display unit of one display apparatus, the plurality of operation screens can be visually recognized simultaneously on one display apparatus. Thus, it is possible to save time and effort for switching the operation screen for each injection apparatus and achieve an operation screen with high operability.

Also in the above described description, the example has been described in which two injection apparatuses are used. However, three or more injection apparatuses may be used. For example, the operation screens of three or more injection apparatuses with converted rendering attributes of the operations screens may be vertically aligned or may overlap one another for display on the LCD/MDI 61*a* of the injection apparatus 2*a*.

Still further, a set value (112° C.) of barrel temperature, which is a molding condition setting item on the operation screen (FIG. 3) of the injection apparatus 2*a* displayed on the LCD/MDI 61*b* of the display apparatus 6*b* of the injection apparatus 2*b* can be changed to another set value (for example, 312° C.) by using the touch panel or MDI key, and this changed set value can be transferred through communication from the injection apparatus 2*b* to the injection apparatus 2*a* via the communication channel 7 and stored in the data storage memory 54*a* of the control apparatus 5*a* of the injection apparatus 2*a*. By using only one injection apparatus, the operator can change not only the set value of the molding condition setting item of that injection apparatus but also the set value of a different injection apparatus. Since the operator is not required to check the operation screen for each display apparatus and set various molding condition setting items for each display apparatus, high work efficiency and operability can be achieved.

Figure 9:
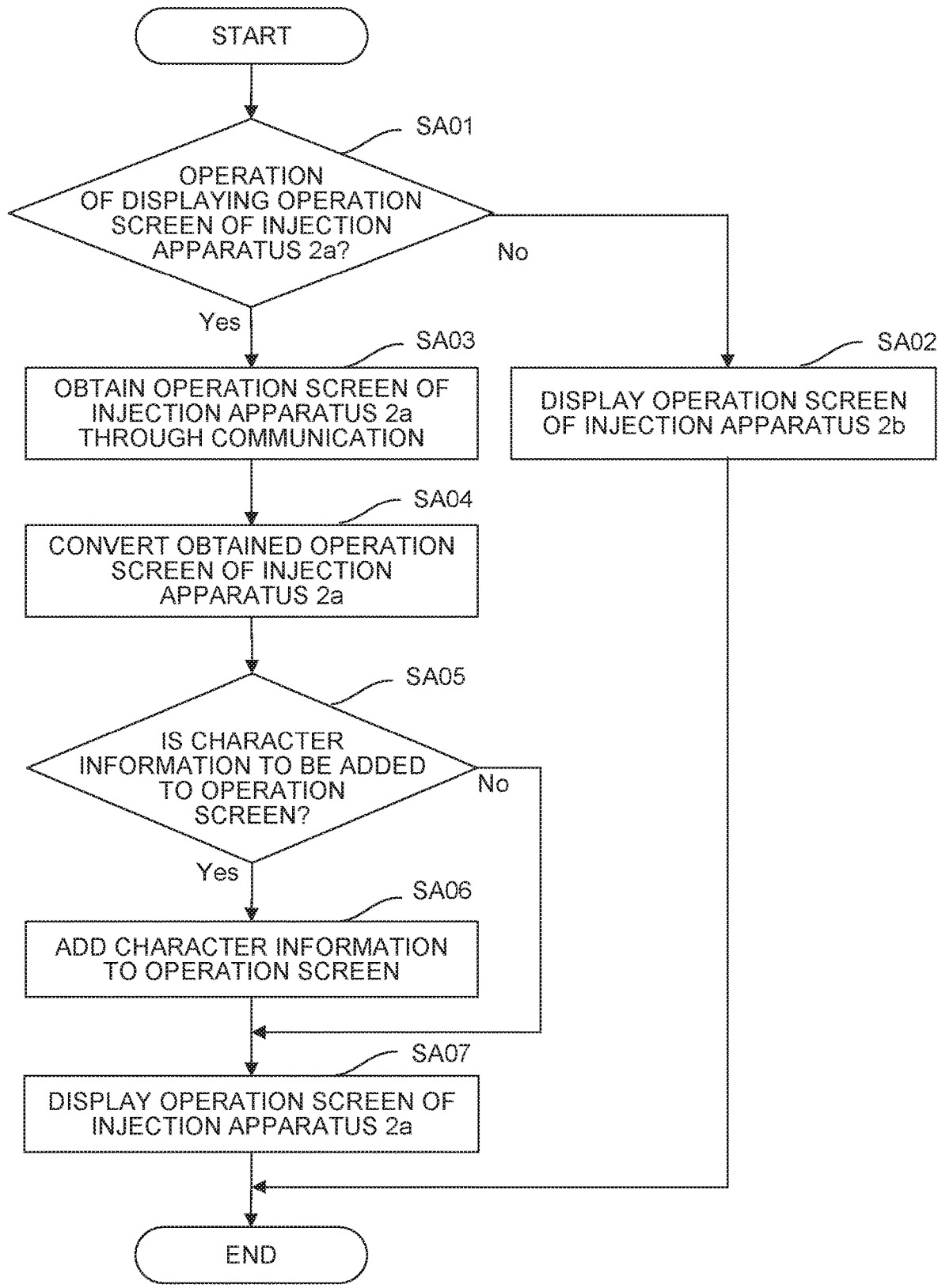
FIG. 9 is a flowchart of a process of switching the operation screen of an injection apparatus to the operation screen of another injection apparatus.

FIG. 9 is a flowchart of a process of switching the operation screen of the above-described injection apparatus 2*b* to the operation screen of the injection apparatus 2*a*.

[Step SA01] The control apparatus 5*b* determines whether the button "Display operation screen of injection apparatus 2*a*" has been pressed on the operation screen of the injection apparatus 2*b*. When the button has been pressed, the process proceeds to step SA03. Otherwise, the process proceeds to step SA02.

[Step SA02] The control apparatus 5*b* causes the operation screen of the injection apparatus 2*b* to be displayed on the LCD/MDI 61*b*.

[Step SA03] The control apparatus 5*b* obtains operation screen data of the injection apparatus 2*a* via the communication channel 7. Here, the control apparatus 5*b* also obtains predetermined character information and graphic information as required.

[Step SA04] The control apparatus 5*b* converts, for example, a rendering attribute of a rendering element of the operation screen to be displayed based on the operation screen data of the injection apparatus 2*a* obtained from the injection apparatus 2*a*, based on the rendering attribute conversion table stored in the data storage memory 54*b*.

[Step SA05] The control apparatus 5*b* determines whether the predetermined character information obtained at step SA03 is to be added to the operation screen. When the predetermined character information and graphic information are to be added to the operation screen, the process proceeds to step SA06. Otherwise, the process proceeds to step SA07.

[Step SA06] The control apparatus 5*b* adds the predetermined character information to the operation screen of the injection apparatus 2*a*.

[Step SA07] The control apparatus 5*b* causes the operation screen of the injection apparatus 2*a* with the rendering attributes converted at step SA04 (and, furthermore, with the predetermined character information added at step SA06) to be displayed on the LCD/MDI 61*b*.

While the embodiment of the present invention has been described above, the present invention is not restricted to only the examples of the above-described embodiment, and can be implemented in various modes by adding modifications as appropriate.

For example, in the above-described example in which the data storage memory of each injection apparatus stores, in advance, the rendering attribute conversion table for use in displaying the operation screen of the injection apparatus, when the control apparatus included in the injection apparatus including the display apparatus obtains the operation screen data from another injection apparatus, the control apparatus also obtains the rendering attribute conversion table stored in the data storage memory of the other injection apparatus, and converts the rendering attribute of the rendering element of the operation screen to be displayed based on the operation screen data obtained according to the obtained rendering attribute conversion table. However, when the control apparatus obtains the operation screen data from another injection apparatus, a rendering attribute converting unit of the other injection apparatus may convert the rendering attribute according to the rendering attribute conversion table stored in the data storage memory. With this structure, the injection apparatus including the display apparatus is not required to convert a rendering attribute. Thus, in particular, when many injection apparatuses are connected, it is possible to prevent concentration of loads on the control apparatus included in the injection apparatus including the display apparatus. Also, since the rendering attribute conversion table is not required to be exchanged via the communication channel 7, the communication load is reduced.

The invention claimed is:

1. An injection molding machine formed to have a plurality of injection apparatuses connected via a communication channel, the plurality of injection apparatuses each including an injection mechanism unit and a control apparatus, wherein
a first injection apparatus among the plurality of injection apparatuses includes a display apparatus,
a first control apparatus included in the first injection apparatus includes a processor, the processor being configured to
obtain, from a second injection apparatus among the plurality of injection apparatuses, operation screen data of the second injection apparatus, and
convert rendering attributes of rendering elements configuring an operation screen to be rendered based on the operation screen data into other rendering attributes, when an operation screen of the second injection apparatus is displayed on the display apparatus based on the operation screen data, in order to make all or part of the rendering attributes of the rendering elements configuring the operation screen different from rendering attributes when an operation screen of the first injection apparatus is displayed.

2. The injection molding machine according to claim 1, further comprising:
a rendering attribute conversion table which defines conversion rules for converting the rendering attributes of the rendering elements configuring the operation screen to be displayed based on the operation screen data of the injection apparatus, wherein
the processor converts the rendering attributes of the rendering elements configuring the operation screen to be rendered based on the operation screen data according to conversion rules defined on the rendering attribute conversion table.

3. The injection molding machine according to claim 1, wherein
the communication channel is a wired communication channel or a wireless communication channel, and
the processor obtains the operation screen data from the second injection apparatus via the communication channel.

4. The injection molding machine according to claim 1, wherein the display apparatus includes
a touch panel or a pointing device, and
switches an operation screen to be displayed on the display apparatus to another operation screen based on selection of part of graphic information or character information to be rendered on the operation screen by operation of the touch panel or the pointing device.

5. The injection molding machine according to claim 1, wherein
the display apparatus includes
an electric-type operation button, and
switches the operation screen to be displayed on the display apparatus to another operation screen based on a pressing operation of the electric-type operation button.

6. The injection molding machine according to claim 1, wherein
the rendering elements are characters or graphics, and
the rendering attributes are attributes which specify rendering colors or shapes of the rendering elements.

7. The injection molding machine according to claim 1, wherein
when the operation screen of the second injection apparatus is displayed on the display apparatus based on the operation screen data, the processor adds a predetermined character string or graphic to the operation screen.

8. The injection molding machine according to claim 1, wherein
on the display apparatus, the operation screen of the first injection apparatus and an entire or part of the operation screen of the second injection apparatus are displayed as being aligned or overlapping each other.

9. The injection molding machine according to claim 1, wherein
each of the plurality of injection apparatuses further has a memory which stores a molding condition regarding operation of the injection apparatus, and
a molding condition of the injection apparatus set via the display apparatus of the first injection apparatus is obtained and stored in the memory.

10. The injection molding machine according to claim 1, wherein the display apparatus is attachable to and detachable from the injection apparatus.

11. An injection molding machine formed to have a plurality of injection apparatuses connected via a communication channel, the plurality of injection apparatuses each including an injection mechanism unit and a control apparatus, wherein
the control apparatus included in each of the plurality of injection apparatuses includes a processor,
a first injection apparatus among the plurality of injection apparatuses includes a display apparatus,
the processor of a first control apparatus included in the first injection apparatus obtains, from a second injection apparatus among the plurality of injection apparatuses, operation screen data of the second injection apparatus, and
when the first injection apparatus obtains the operation screen data of the second injection apparatus, the processor of the second injection apparatus converts rendering attributes of rendering elements configuring an operation screen to be rendered based on the operation screen data, in order to make all or part of the rendering attributes of the rendering elements configuring the operation screen different from rendering attributes when an operation screen of the first injection apparatus is displayed.

* * * * *